(12) United States Patent
Wulferding

(10) Patent No.: US 12,477,974 B2
(45) Date of Patent: Nov. 25, 2025

(54) DEVICE FOR SEPARATING PLANTING MATERIAL

(71) Applicant: Grimme Landmaschinenfabrik GmbH & Co. KG, Damme (DE)

(72) Inventor: Henrik Wulferding, Ehrenburg (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 995 days.

(21) Appl. No.: 17/520,359

(22) Filed: Nov. 5, 2021

(65) Prior Publication Data

US 2022/0132727 A1 May 5, 2022

(30) Foreign Application Priority Data

Nov. 5, 2020 (DE) .......................... 202020106359.6

(51) Int. Cl.
*A01C 9/02* (2006.01)
(52) U.S. Cl.
CPC ...................................... *A01C 9/02* (2013.01)
(58) Field of Classification Search
CPC .... A01C 9/08; A01C 9/06; A01C 9/04; A01C 9/02; A01C 9/00
See application file for complete search history.

(56) References Cited

U.S. PATENT DOCUMENTS

| | | | | |
|---|---|---|---|---|
| 4,008,826 A | * | 2/1977 | Carree | A01C 9/02 221/253 |
| 11,612,100 B2 | * | 3/2023 | Borgmann | A01C 9/02 111/171 |
| 2006/0283363 A1 | * | 12/2006 | Wollman | A01C 9/02 111/15 |
| 2010/0107944 A1 | * | 5/2010 | Snipes | A01C 9/02 111/171 |
| 2015/0101517 A1 | | 4/2015 | Borgmann et al. | |
| 2022/0132727 A1 | * | 5/2022 | Wulferding | A01C 9/02 111/104 |

FOREIGN PATENT DOCUMENTS

| | | | | |
|---|---|---|---|---|
| CN | 107750550 A | * | 3/2018 | ............... A01C 9/02 |
| CN | 207978317 U | | 10/2018 | |
| CN | 118556476 A | * | 8/2024 | |
| DE | 2214134 A1 | | 9/1973 | |
| DE | 2264984 A | * | 10/1975 | ............... A01C 9/02 |

(Continued)

*Primary Examiner* — Jamie L McGowan
(74) *Attorney, Agent, or Firm* — Husch Blackwell LLP

(57) ABSTRACT

A device comprising a hopper forming a storage space, and at least one conveyor device configured for placing a row of the planting material. The conveyor device comprises at least one carrier element rotating in operation in a direction of rotation and about a deflection axis, and a plurality of conveying elements arranged on the carrier element, which, in operation, each run through the storage space for receiving a planting material component being in a first position relative to the carrier element, and through a dispensing area for dispensing the planting material component. At least a first one of the conveying elements, particularly at least half of the conveying elements, is mounted so as to be movable relative to the carrier element from the first position into a second position at least proportionally parallel to the deflection axis.

24 Claims, 11 Drawing Sheets

(56) References Cited

FOREIGN PATENT DOCUMENTS

| DE | 2548359 B | * | 5/1977 | ............... A01C 9/02 |
|----|-----------|---|--------|---------------------------|
| DE | 2936413 A1 | | 3/1981 | |
| DE | 4217828 C1 | * | 10/1993 | ............... A01C 9/02 |
| DE | 102009055309 A1 | * | 8/2010 | ............ A01B 13/02 |
| DE | 102014003445 A1 | * | 9/2015 | ............ A01C 7/105 |
| DE | 102018107643 A1 | * | 9/2019 | ............ A01C 19/02 |
| DE | 102009055309 B4 | * | 11/2019 | ............ A01B 13/02 |
| DE | 102014019942 B3 | * | 10/2021 | ............ A01C 7/105 |
| EP | 2215903 B1 | | 9/2011 | |

\* cited by examiner

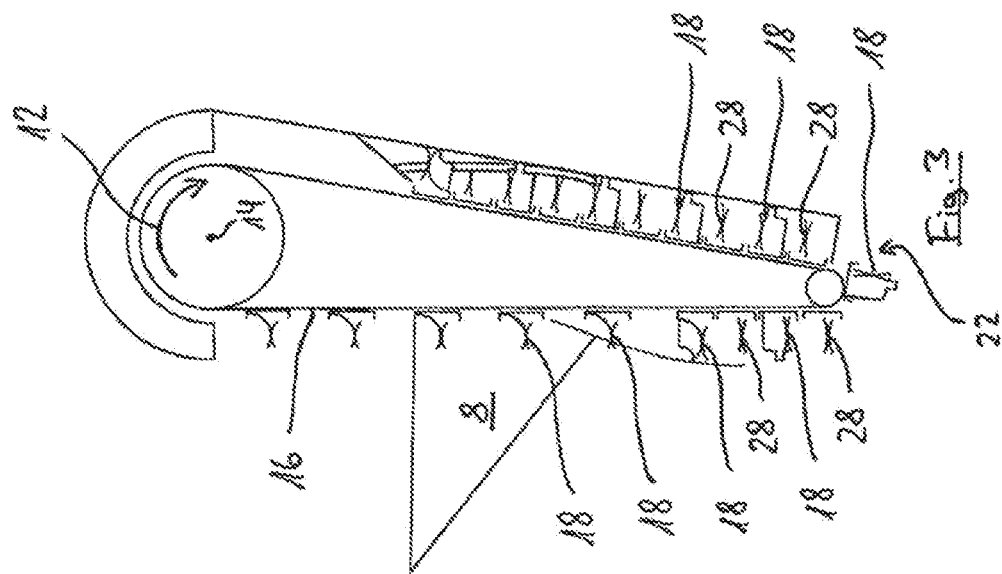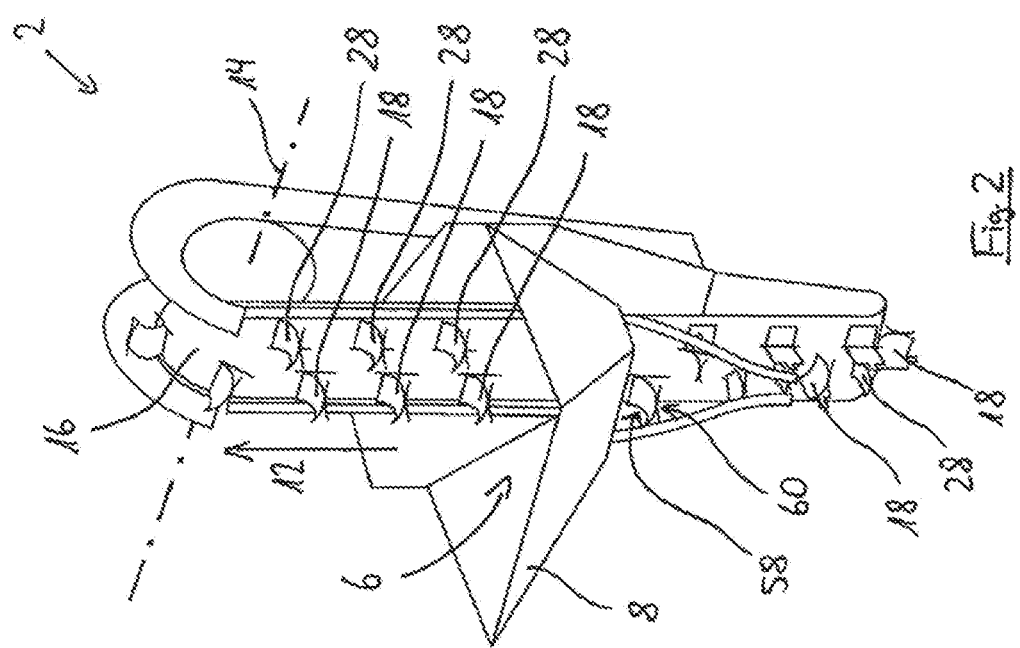

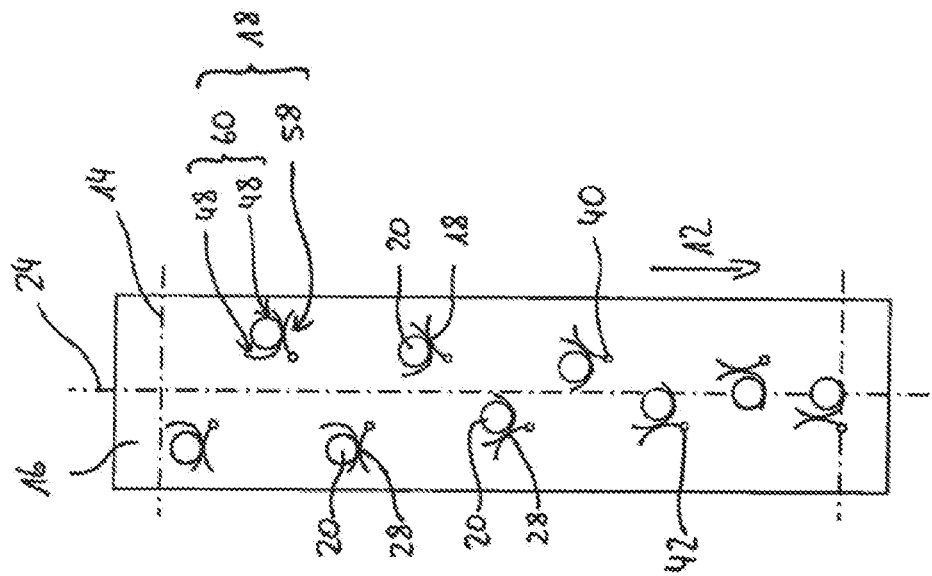
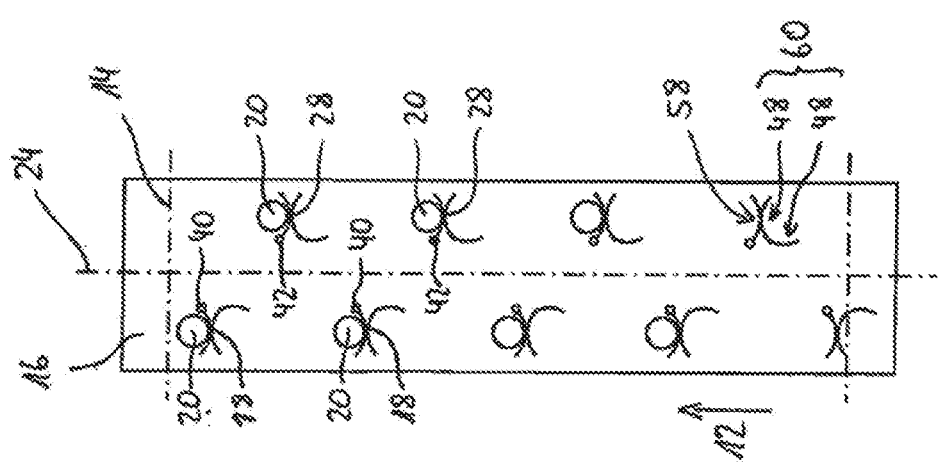

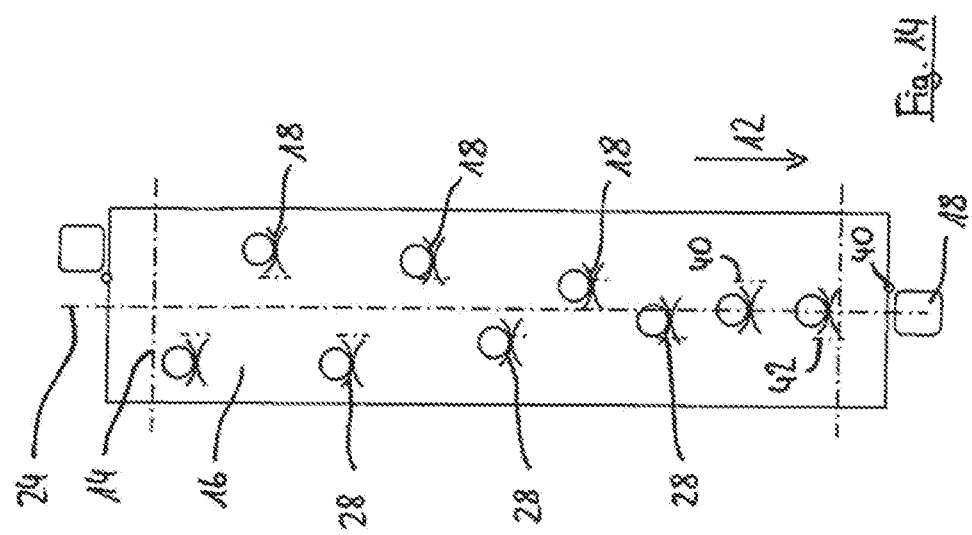
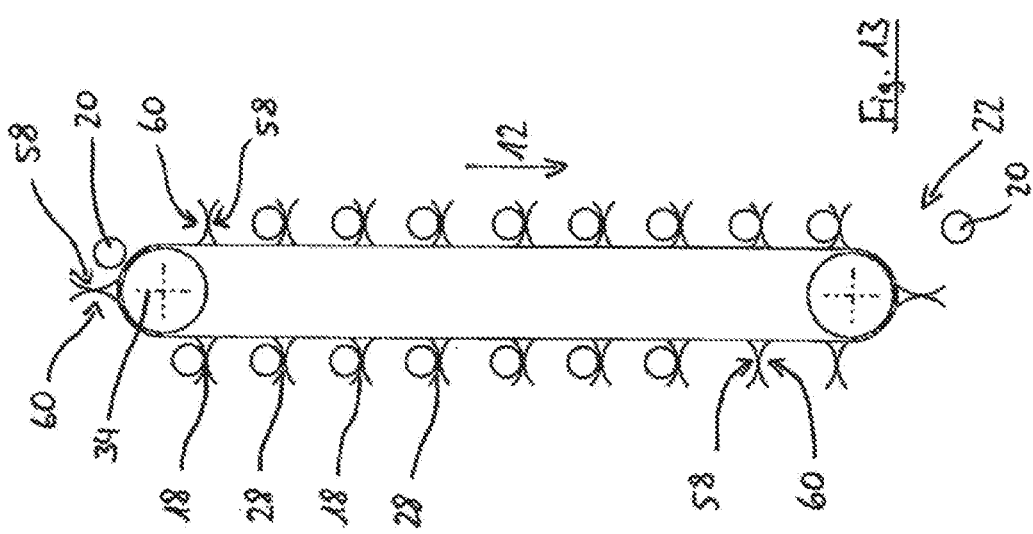
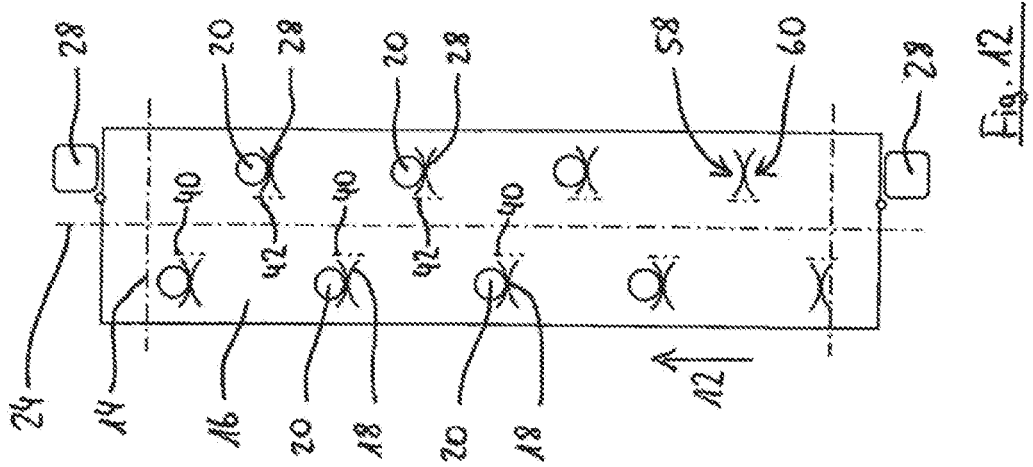

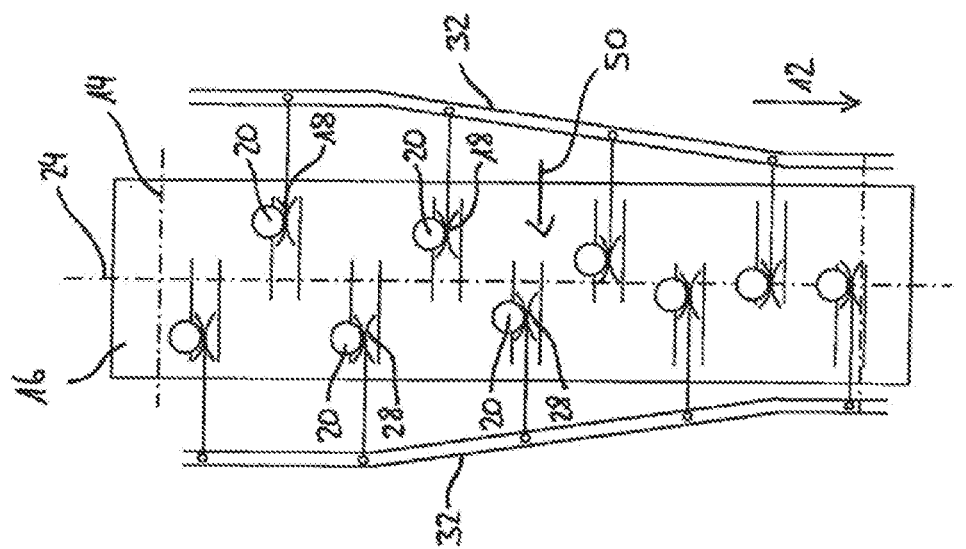
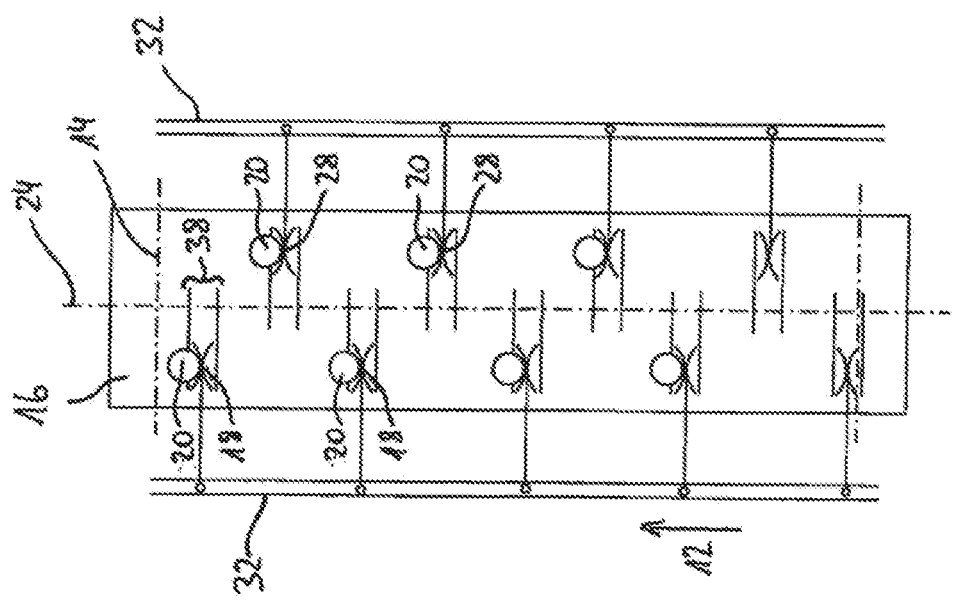

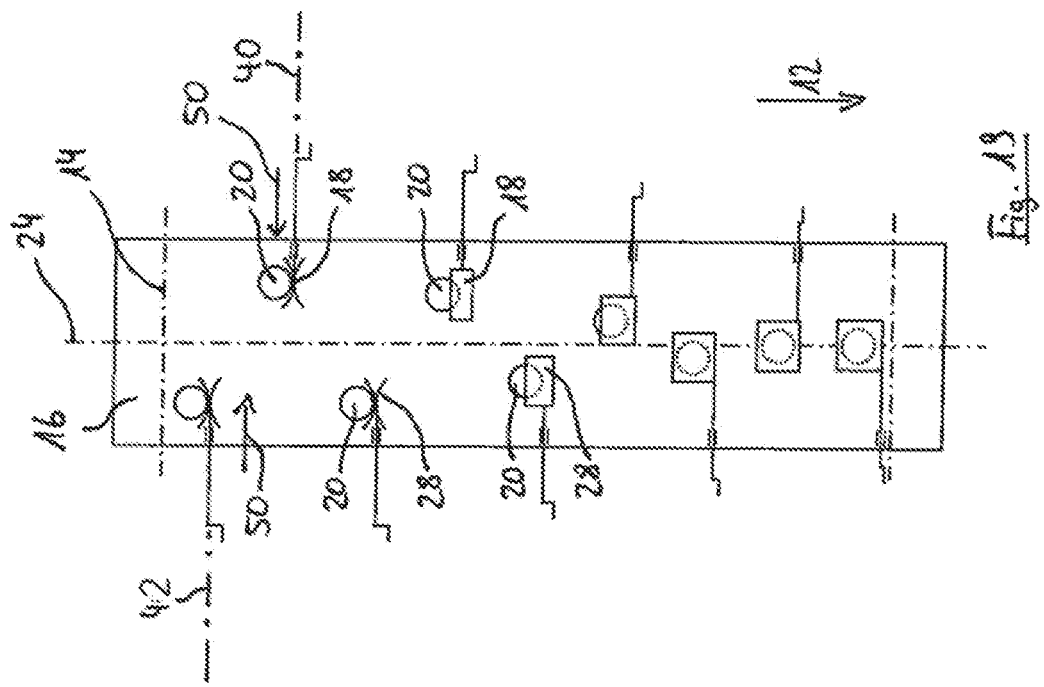

DEVICE FOR SEPARATING PLANTING MATERIAL

CROSS REFERENCE

This application claims priority to German Patent Application No. 20 2020 106359.6, filed Nov. 5, 2020, the entirety of which is hereby incorporated by reference.

FIELD OF THE INVENTION

The invention relates to a device for separating planting material such as seed potatoes. The device includes a hopper forming a storage space for the planting material. Furthermore, the device includes at least one conveyor device configured to place a row of the planting material. The conveyor device comprises at least one carrier element, which in operation rotates in a direction of rotation and about a deflection axis. In addition, the conveyor device comprises a plurality of conveying elements disposed on the carrier element. During operation of the device for picking up a planting material component, the conveying elements each run through the storage space in a first position relative to the carrier element. Conveying elements then pass through a dispensing area to dispense the planting material component.

BACKGROUND OF THE INVENTION

Such a device is particularly known as a potato planter. As intended, each conveying element conveys one planting material component per cycle from the storage area to the dispensing area. In their first position, the conveying elements are arranged on the carrier element particularly at a lateral offset to the adjacent conveying elements to ensure reliable pickup of the planting material components. In this case, the conveyor device is designed to place a row of the planting material in that the planting material components fall to the ground after leaving the dispensing area, and successively dispensed planting material components are then spaced apart from one another in a direction of movement of the device.

A disadvantage of the known devices, particularly because of the laterally offset conveying elements, is that the placement of the planting material components is subject to significant scattering, such that a significant proportion of the planting material is placed on the ground, particular to the side of its optimum position. Baffle plates below the dispensing area also failed to solve this problem. This results in insufficient or excessive spacing of adjacent planting material components or in row-separating furrows, either limiting the growth of the resulting crop or leaving soil reserves unused.

BRIEF SUMMARY OF THE INVENTION

It is the object of the present invention to provide a generic device for achieving more accurate positioning of the planting material components on the ground.

According to the invention, at least a first one of the conveying elements is mounted so as to be movable relative to the carrier element from the first position at least proportionally parallel to the deflection axis into a second position. Particularly, at least half of the conveying elements are mounted so as to be movable relative to the carrier element. Preferably, the device is configured such that, when in operation, the at least one first conveying element or all first conveying elements are transferred from the first position to the second position during their circulation between the storage space and the dispensing area. The option of moving the at least one first conveying element relative to the carrier element, particularly in a transverse direction perpendicular to the direction of rotation, means that each planting material component can be placed along the transverse direction at precisely the position that is desired. This allows each plant to thrive in the best possible way and ultimately maximizes crop yield.

The device is particularly suitable for planting potatoes, beets, onions, sugar cane, and/or garlic. Accordingly, the planting material particularly is tubers or tuber components, seeds, bulbs and/or cuttings, preferably potatoes. The conveying element is preferably configured to receive these items.

Particularly, the hopper is trough-shaped and forms the storage space. Before starting the operation of the device, the hopper is filled with planting material. Particularly, the device comprises a plurality of conveyor devices which are arranged at a distance from each other, particularly in the transverse direction, and by which the device is configured for simultaneous planting of a plurality of rows of the planting material.

The carrier element of the at least one conveyor device is particularly configured as a flexible component, i.e. one that deforms under the force of gravity when there is insufficient tension or spacing of the ends of the carrier element in the circumferential or longitudinal direction. Preferably, the carrier element is at least partially formed as a belt, band, chain, or wheel. In operation, the carrier element rotates in the direction of rotation and at least temporarily rotates about the deflection axis. Particularly, the carrier element itself or a deflection element such as a deflection roller, which is configured to deflect the carrier element, is rotatably mounted about the deflection axis. The deflection axis is particularly oriented horizontally and at right angles to the intended direction of travel of the device, i.e. it runs in the transverse direction.

Multiple conveying elements are arranged on the carrier element. Particularly, the conveying elements each form at least one trough in which, as far as possible, a planting material component is arranged as it passes through the storage space. Preferably, the conveying elements have continuous recesses in the direction of rotation, whereby in operation they assume a screening function in addition to the conveying function. Preferably, all conveying elements are of a uniform configuration.

In operation, i.e. while the carrier element is rotating, the conveying elements preferably pass alternately through the storage space and the dispensing area. In the storage space, each conveying element picks up a planting material component as precisely as possible and releases it again in the dispensing area. This means that the picked-up planting material components separate from the conveying elements in the dispensing area and, particularly, fall out of the dispensing area towards the ground.

Within the storage space, the conveying elements are arranged relative to the carrier element at least in sections, particularly exclusively, in the respective first position. The first position can be different, particularly in the transverse direction relative to the carrier element, depending on the conveying element. A part of the conveying elements is movable from its first position relative to the carrier element into a second position, for which purpose it is movable at least proportionally parallel to the deflection axis, i.e. particularly at least proportionally in the transverse direction.

Particularly, the at least one first conveying element is movable towards that section of the carrier element on which the first conveying element itself is directly arranged. Thus, the mobility goes beyond a mobility according to the prior art, according to which a section of the carrier element at a distance from a conveying element is naturally movable relative to the conveying element due to its flexibility.

The at least one first conveying element is preferably movable relative to the carrier element during operation and/or standstill of the conveyor device. Particularly, the movement of the conveying element relative to the carrier element depends on a rotational movement of the carrier element. Particularly, the conveyor device is designed in such a way that the first conveying element is moved from the first position to the second position at least proportionally during an upward and/or downward movement.

At least two deflection elements, which rotate about parallel deflection axes, are particularly used to deflect the carrier element. Particularly, the deflection elements are arranged one above the other, whereby the carrier element has an upward and a downward strand. The upward strand or the conveying elements arranged thereon are at least partially located within the storage space. The downward strand and the conveying elements arranged thereon preferably run at least partially through a housing which is stationary relative to the deflection axes, and which prevents the planting material components from falling off the conveying elements on which they rest in particular in the downward strand. As an alternative to the housing, the conveyor device has clamping fingers or the like that provide for fixation of the planting material components to the conveying elements.

Preferably, the first conveying element is arranged in the first position on one side of a carrier element longitudinal plane and at least a second one of the conveying elements is arranged in the first position on the other side of the carrier element longitudinal plane. The carrier element longitudinal plane extends parallel to the direction of rotation and thus at right angles to the deflection axis. Particularly, the carrier element longitudinal plane is arranged in such a way that it divides the carrier element into two halves of equal width. The arrangement of the different conveying elements on different sides of the carrier element longitudinal plane in their first position means that the first and second conveying elements are arranged next to each other within the storage space and as viewed in the direction of rotation, at least offset in time or simultaneously. As a result, the first and second conveying elements do not negatively influence each other when picking up a respective planting material component, and the pickup of exactly one planting material component per conveying element can be reliably ensured.

Preferably, half of the conveying elements of the conveyor device belong to a group of first conveying elements and a second half of the conveying elements of the conveyor device belong to a group of second conveying elements. First and second conveying elements preferably alternate along the direction of rotation. Alternatively, the conveyor device preferably has at least one other conveying element or a group of other conveying elements that does not fall under the aforementioned groups. The at least one other conveying element is arranged in its first position offset in relation to the transverse direction, both with respect to the first conveying elements and with respect to the second conveying elements.

Preferably, at least the at least one first conveying element is movable from the first position towards the carrier element longitudinal plane into the second position. Particularly preferably, both the at least one first conveying element and the at least one second conveying element are each movable from their first position towards the carrier element longitudinal plane into the second position. This results in at least a reduction of a distance between the different conveying elements in the transverse direction. This makes it possible to combine the advantage described above within the storage space with the advantage of conveying elements in the discharge area that are spaced just a little or not at all apart from one another in the transverse direction, as a result of which the planting material components in the discharge area are discharged at least to a large extent from a matching position in relation to the transverse direction.

Preferably, the at least one first conveying element in its second position and the at least one second conveying element, particularly also in the second position, are arranged at least partially one behind the other as viewed in the direction of rotation. Particularly, this means that when one of the conveying elements moves to the second position, the carrier element longitudinal plane is passed through. Particularly, the carrier element longitudinal plane intersects the first and second conveying elements in the second position. Particularly preferably, the carrier element longitudinal plane intersects all the conveying elements at the center in their second position. Thus, in the second position, the first and second conveying elements have a matching position relative to the carrier element with respect to the transverse direction. The first and second conveying elements are particularly mounted mirror-symmetrically to each other and offset in the direction of rotation. Alternatively, only the at least one first conveying element is movable relative to the carrier element and the at least one second conveying element is already intersected in its first position by the carrier element longitudinal plane, particularly centrally. In this case, the carrier element longitudinal plane intersects the carrier element, in particular off-center and/or, particularly, all conveying elements are equidistant in their first position from the nearest lateral edge of the carrier element. This close combination of conveying elements increases the aforementioned advantage. In detail, the advantage can be extended in such a way that all the planting material components in the dispensing area are dispensed from an identical position, particularly in relation to the transverse direction.

Preferably, the first conveying element in the first and/or second position is arranged offset from the second conveying element in the first and/or second position in relation to the direction of rotation. Particularly, the at least one movable conveying element does not change its position relative to the carrier element during its movement from the first to the second position. The first and second conveying elements, which are preferably arranged alternately, are particularly at a uniform distance from the respective adjacent conveying elements.

The conveyor device is preferably designed in such a way that the first conveying element is transferred from the first to the second position during the rotation of the carrier element along the direction of rotation between the storage space and the dispensing area. Particularly, the transfer takes place gradually or in stages. In addition, the conveyor device is particularly configured to return the first conveying element from the second position to the first position between the dispensing area and the storage space. Particularly, each conveying element of the conveyor device is transferred once per revolution from the first to the second position and once per revolution from the second to the first position.

Preferably, the device or its conveyor device has at least a first guide element that is particularly stationary relative to a machine frame of the device during operation. The guide element has at least one guide surface. The guide element is configured for a partial movement of at least the first conveying element from the first position to the second position and/or back during the rotation of the carrier element. Particularly, the guide surface is at least temporarily in contact with the conveying element or a stationary component. The guide element is particularly configured as a guide rail, guide gap, and/or by rollers. Particularly, the guide element is not configured to rotate with the carrier element during operation. By means of the guide element, a reliable movement of at least the first conveying element from the first position to the second position and/or from the second position to the first position is achieved at least partially, in particular completely.

Alternatively, the at least one first conveying element is mounted particularly in such a way that it is configured to be movable by gravity from the first to the second position and/or back. Alternatively or additionally, the conveying element is coupled to a return element, such as a spring, which rotates with the carrier element, particularly during operation, and by means of which the conveying element can be moved from the first to the second position and/or back. Particularly, the deflection of the carrier element about the deflection axis leads to a gravity-induced folding of the conveying element, which is necessarily accompanied by a movement in the transverse direction.

Particularly, a first guide element is associated with the group of first conveying elements and a second guide element is associated with the group of second conveying elements. Particularly, the first and second guide elements are mirror-symmetrical with respect to the longitudinal axis of the carrier element. Each guide element is in one or more parts and/or has one or two guide surfaces which guide a guided element, particularly on both sides.

Preferably, a distance or orientation of the guide surface varies relative to the carrier element longitudinal plane. Alternatively or additionally, the distance or orientation to a transverse plane of the carrier element varies, which transverse plane is perpendicular to the carrier element longitudinal plane and extends locally parallel to the direction of rotation and particularly perpendicular to the carrier element longitudinal plane. Particularly, the guide surface is configured in such a way that the guided conveying element is gradually accelerated and then decelerated in the transverse direction. Particularly, the guide element is configured as a sheet metal or plastic component that approaches the carrier element longitudinal plane in the direction of rotation, or as a sheet metal or plastic component that rotates in the direction of rotation about an axis parallel to the direction of rotation.

The at least one guide element is positioned in such a way that, during operation, at least the first conveying element is moved at least proportionally downwards along the guide element. Particularly, this means that the guide element is at least partially arranged in the area of the downward strand. As a result, the conveying elements can remain in their first position in the storage space up to the maximum height of the carrier element to take advantage of the associated benefits to the greatest possible extent. Particularly, the positioning of the guide element described above allows a more compact design of the conveyor device, which thus does not have to be stretched further upwards for the benefit of the guide element. Alternatively or in addition to this configuration, at least part of the guide element is arranged in the region of the upward strand, particularly to return at least the first conveying element from the second to the first position.

Preferably, the first conveying element is mounted such that it has an at least substantially matching distance from the carrier element in the first position and in the second position. As a result, the conveying element projects the same distance from the carrier element in both positions, which facilitates the uniform configuration of the carrier element and surrounding components. Alternatively or additionally, the conveying element is at least substantially coincident in the first position and in the second position with respect to the direction of rotation relative to the carrier element. This means that the conveying element is not displaced, not even proportionally, in the direction of rotation when it is moved from the first to the second position or back. This avoids a variable causing uncertainty with respect to the exact positioning of the planting material components.

Preferably, a movement device is associated with the first conveying element, which device comprises at least one fixing element arranged in a stationary manner on the carrier element and coupled at least indirectly to the first conveying element. The fixing element is preferably arranged at least in part between the carrier element and the conveying element in at least one position of the conveying element and is in particular rigid. The fixing element is in particular a plastic or metal component that is riveted or screwed to the carrier element. Particularly, this involves a sheet clamped to the carrier element. Particularly preferably, the movement device comprises another fixing element which is movably mounted with respect to the aforementioned fixing element and is arranged in a stationary manner on the first conveying element. The two fixing elements are particularly preferably legs of a hinge, particularly a film hinge. This provides a reliable mounting for the first conveying element. As an alternative to the movement device, the carrier element preferably has at least one elongated recess per first conveying element, within which recess the conveying element is movable relative to the carrier element.

Preferably, the first conveying element is arranged on the carrier element so as to be at least partially pivotable about a conveying element pivot axis. For this purpose, the aforementioned fixing elements are particularly connected to each other by means of a pivot bearing. A swiveling movement, for example, is particularly easy to implement compared to a translational movement, making the device particularly reliable to operate.

The mobility of the first conveying element relative to the carrier element particularly goes beyond a mere pivoting movement. Particularly, the pivoting movement is superimposed by another movement or joins another movement for transferring the first conveying element from the first position to the second position or back. Particularly, the swivel axis of the swivel movement is stationary relative to the carrier element and thus rotates with it during operation.

During operation, the conveying element pivot axis is preferably at least temporarily arranged parallel to the direction of rotation. In this case, the conveying element pivot axis is preferably closer to the carrier element in at least one position of the conveying element than the conveying element itself or its center. The conveying element swivel axis is in particular only temporarily parallel to the direction of rotation, since this is oriented straight only between the in particular at least two deflection elements, as is also the conveying element swivel axis. This positioning of the conveying element pivot axis makes it possible to achieve a movement of the conveying element in the transverse direction without having to change the position of the planting material component relative to the conveying element on which it rests.

Particularly preferably, viewed in the direction of rotation, the conveying element pivot axis of the first conveying element is arranged on one side of the carrier element longitudinal plane, and a conveying element pivot axis of the second conveying element is arranged on the other side of the carrier element longitudinal plane. In this case, the conveying element pivot axes of all first conveying elements preferably lie in a plane parallel to the longitudinal plane of the conveying element, preferably in the same way as the conveying element pivot axes of the second conveying elements. Due to the spacing of the conveying element pivot axes in the transverse direction, such spacing of the conveying elements in their first position is also facilitated and requires less spacing of the conveying elements from the respective conveying element pivot axis. This, in turn, simplifies the design. Alternatively, although all conveying elements can be pivoted about a conveying element pivot axis, all conveying element pivot axes are arranged in the carrier element longitudinal plane. This design allows for a narrower carrier element.

Preferably, the device or the conveyor device comprises at least one holding element arranged in a stationary manner on the first conveying element. This holding element is in particular integral with the other fixation element described above. The holding element distances the first conveying element from the conveying element pivot axis in a radial direction with respect to the conveying element pivot axis. The holding element preferably distances the first conveying element from the conveying element pivot axis by at least a distance corresponding to half of an extension of the first conveying element in the radial direction, which particularly preferably corresponds to at least the entire extension of the first conveying element in the radial direction. This creates a lever arm that enables further displacement of the first conveying element in the transverse direction in a structurally simple manner.

The other fixing element or the holding element is preferably configured for pivoting relative to the carrier element by at least 45°, particularly preferably by at least 90°, especially at least 180°. This also provides extensive mobility of the first conveying element relative to the carrier element.

Preferably, a first holding element is arranged on the first conveying element and a second holding element is arranged on the second conveying element. The first and second holding elements are configured differently from each other. Particularly, the first and second holding elements are configured to be mirror-symmetrical with respect to each other or are arranged mirror-symmetrically on the carrier element or fixing element as viewed in the direction of rotation. The different configuration of the holding elements of the different groups of conveying elements also facilitates their different guidance. Preferably, the different holding elements form different points of engagement for the respective at least one guide element. Particularly, the holding elements are angled sheets or plastic components, the legs of which extend flat or round in the direction of rotation.

In an advantageous embodiment of the invention, the conveying element pivot axis is angled, preferably perpendicular, to the direction of rotation and parallel to the carrier element longitudinal plane or arranged in the carrier element longitudinal plane. As a result, the first conveying element can be tilted, particularly in the transverse direction. Preferably, the first conveying element has two dispenser troughs arranged at an angle to each other about the conveying element pivot axis. The angle by which the dispenser troughs are angled relative to one another corresponds particularly to an angular difference between 180° and the angle by which the first conveying element can be pivoted about the conveying element pivot axis. Preferably, the dispenser troughs are arranged at an angle of 90° to each other. The dispenser troughs face each other at least proportionally, such that a planting material component can easily pass from one of the dispenser troughs into the other of the planting troughs. The advantage of this variant is the particularly low installation space requirement of the conveying element as well as its rapid adjustability.

The first conveying element is preferably arranged on the carrier element so that it can be moved at least partially in a thrust direction at right angles to the carrier element longitudinal plane, particularly completely. For this purpose, the movement device particularly has a linear bearing. This is particularly configured as a plain bearing or ball or roller bearing. Particularly, the thrust direction coincides with the transverse direction. This form of mobility of the first conveying element allows the planting material component to be displaced in the transverse direction by the shortest possible route and, above all, the guide element to be configured in a particularly simple manner.

Preferably, the first conveying element is arranged on the carrier element by means of a coupling gear. Particularly, the coupling gear forms a parallel guide. During operation, the coupling pivot axes of the coupling gear are particularly arranged parallel to the direction of rotation, at least temporarily. Particularly, the movement device comprises two fixing elements and two coupling elements forming the parallel guide. Alternatively or additionally, the coupling gear preferably comprises a profile made of a flexible material, and the parallel guidance is achieved by elastic deformation, particularly bending, of said flexible material. On the one hand, this configuration prevents a change in orientation of the planting material component relative to the carrier element during a movement of the first conveying element. On the other hand, the mobility is implemented solely by pivot bearings, which are particularly reliable.

Preferably, the conveying element pivot axis is angled, preferably at a right angle, to the carrier element longitudinal plane. Particularly, this makes it possible to clamp planting material components between the first conveying element and the carrier element or the fixing element and thus to avoid separation of the planting material components from the conveying elements that have received them in the storage space, even in the downward strand.

Preferably, the first conveying element is mounted in such a way that it can be moved and pivoted independently. This means that it can be pivoted regardless of a position to which it is shifted, and it can likewise be moved regardless of a position to which it is pivoted. Thus, the first conveying element is not only movable along a predetermined path of motion, but its position can be changed by multiple degrees of freedom. Particularly, it is simultaneously proportionally movable and proportionally pivotable. Alternatively, it can only be moved and pivoted successively. Particularly, the device has one guide element each for the different movement options, whereby preferably a displacement guide element and a pivot guide element are present. The pivot axis into which the conveying element can be pivoted in this configuration is particularly arranged at right angles to the carrier element longitudinal plane. The other fixing element particularly comprises a crank directed away from the carrier element, which crank can be pivoted and also moved in the direction of the pivot axis. In this way, planting material components can first be clamped and then moved in the transverse direction to prevent the planting material component from falling down due to the transverse acceleration of the conveying element. Alternatively, the planting material components can first be moved and then clamped.

Preferably, the first conveying element can be pivoted proportionally about a pivot axis parallel to the deflection axis, at least sectionally, by means of an at least substantially arch or spiral segment-shaped holding element. Alternatively or additionally, the first conveying element is arranged on the carrier element by means of the holding element, such that it can be moved proportionally in a thrust direction at right angles to the carrier element longitudinal plane. In this case, the first conveying element particularly has only one degree of freedom and is movable along a predetermined path of motion. Accordingly, the movement is a complex, superimposed movement that combines the aforementioned advantages and at the same time implements the shortest possible path along which the conveying element is to be moved.

Preferably, the first conveying element is arranged on the respective carrier element in such a way that, at least in the first position or in the second position, the first conveying element projects beyond the carrier element transversely to the carrier element longitudinal plane as viewed from a radial direction, i.e. in a plan view. Particularly, the conveying element predominantly protrudes laterally over the carrier element. This applies particularly to all conveying elements that are movable relative to the carrier element, and particularly preferably to all conveying elements. This configuration enables easier guiding of the conveying elements as well as further movement of them. The radial direction is arranged parallel to the carrier element longitudinal plane or in said plane and transverse to the direction of rotation.

The first conveying element preferably has a first side and a second side. The first side is upwardly directed and trough-shaped within at least a portion of the storage space. The second side is directed downward within at least a portion of the storage space and is particularly trough-shaped and at least substantially mirror-symmetrically to the first side. Particularly, each side of the conveying element has at least one dispenser trough. The fact that the conveying element is equipped with a dispenser trough on both sides stabilizes both the position of a planting material component resting on the conveying element during an upward movement of the latter, and the position of a planting material component resting on its opposite side during a downward movement of the conveying element. Particularly, in the area of an upper deflection of the carrier element, the planting material components pass from the conveying element which has received them in the storage space to a conveying element running ahead in the direction of rotation and place themselves on the second side thereof. This prevents irregular placement of planting material components over time.

Furthermore, the object is achieved by a potato planter with a coupling device for coupling the potato planter with a tractor. Moreover, the potato planter has a device described above and/or below, particularly comprising a plurality of conveyor devices. The conveyor devices are preferably each assigned at least one blade element for creating a furrow, wherein the dispensing area is arranged behind the blade element in relation to a direction of travel. During operation, the blade element opens a furrow in which the planting material components are placed. After that, the furrow is closed and the planting material components are covered with soil; particularly, a dam is formed for this purpose.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2 shows a schematic perspective view of a first device according to the invention.

FIG. 3 shows a longitudinal section of the device according to FIG. 2.

FIG. 10 shows a schematic rear view of a fourth conveyor device.

FIG. 11 shows a schematic front view of a fifth conveyor device.

FIG. 12 shows a schematic rear view of a sixth conveyor device.

FIG. 13 shows a schematic side view of the sixth conveyor device.

FIG. 14 shows a schematic front view of a seventh conveyor device.

FIG. 15 shows a schematic rear view of an eighth conveyor device.

FIG. 16 shows a schematic front view of a ninth conveyor device.

FIG. 18 shows a schematic rear view of a tenth conveyor device.

FIG. 19 shows a schematic front view of an eleventh conveyor device.

DETAILED DESCRIPTION OF THE INVENTION

Figure 1:
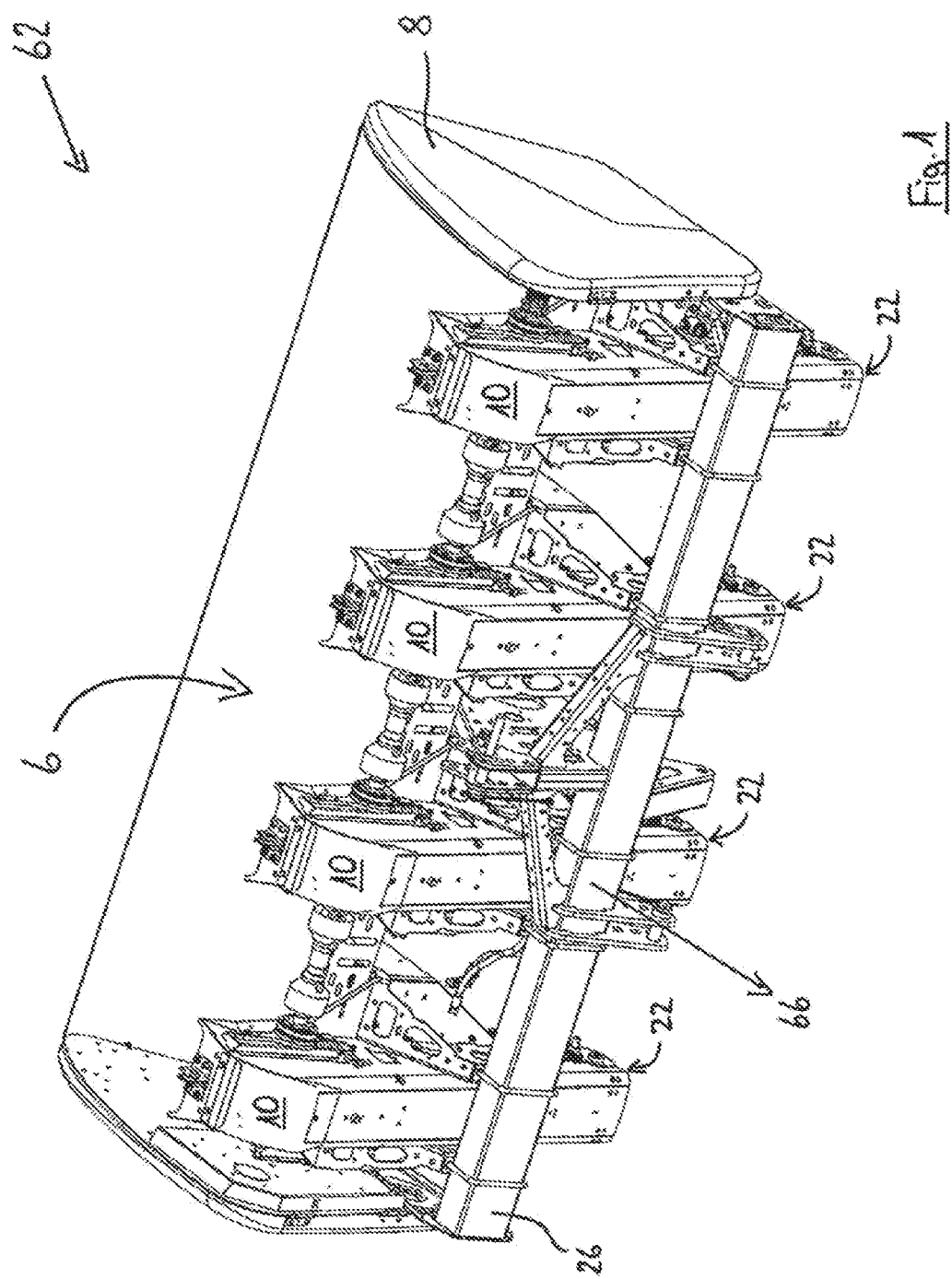
FIG. 1 shows a perspective view of a potato planter according to the invention.

The features of the embodiments according to the invention explained below can also be the subject matter of the invention individually or in combinations other than those shown or described, but always at least in combination with the features of claim 1. Where appropriate, functionally equivalent parts are given identical reference numerals.

The device 2 according to the invention, different embodiments and components of which are shown in the figures, is configured for separating planting material consisting of planting material components 20, such as potatoes. For this purpose, the device 2 comprises a storage space 6 formed by a hopper 8. In addition, the device 2 comprises at least one conveyor device 10 for placing a row of the planting material.

The potato planter 62 shown in FIG. 1 and comprising the device 2 has, in detail, four conveyor devices 10 arranged upstream of the hopper 8 in a direction of travel 66. Particularly, the potato planter 62 has one blade element, not shown, per conveyor device 10 for creating a furrow. Each conveyor device 10 has a dispensing area 22, in front of which the furrow is created during operation in relation to the direction of travel 66 and from which the planting material is dispensed by the device 2.

The conveyor devices 10 shown each have a carrier element 16 which, in operation, rotates in a direction of rotation 12 and about a deflection axis 14 (see in particular FIG. 2). A plurality of conveying elements 18, 28 are arranged on the carrier element 16. In operation, the conveying elements 18, 28 run through the storage space 6, each for receiving one planting material component 20 being in a first position relative to the carrier element 16. For dispensing the planting material component 20, the conveying elements 18, 28 subsequently run through the dispensing area 22. FIG. 3 shows that the carrier element 16 is deflected by an upper deflection roller between the storage space 6 and the dispensing area 22 and, at least in this exemplary embodiment, is deflected again near the dispensing area 22.

All of the conveying elements 18, 28 of the exemplary embodiments shown are mounted so as to be movable relative to the carrier element 16 from the first position, in which they pass through the storage space 6, into a second position at least proportionally parallel to the deflection axis 14. In this second position, the conveying elements 18, 28 extend into the dispensing area 22.

Figure 4:
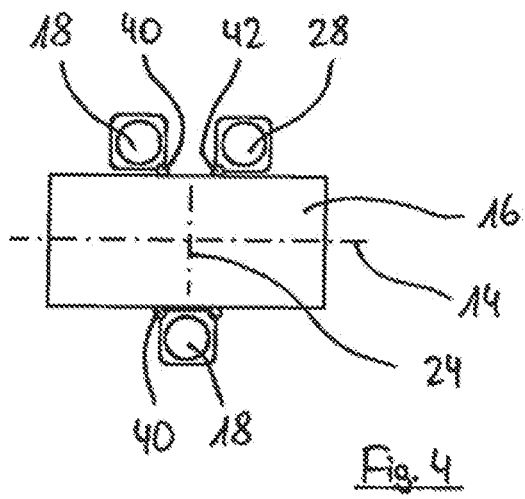
FIG. 4 shows a schematic plan view of a first conveyor device.
Figure 5:
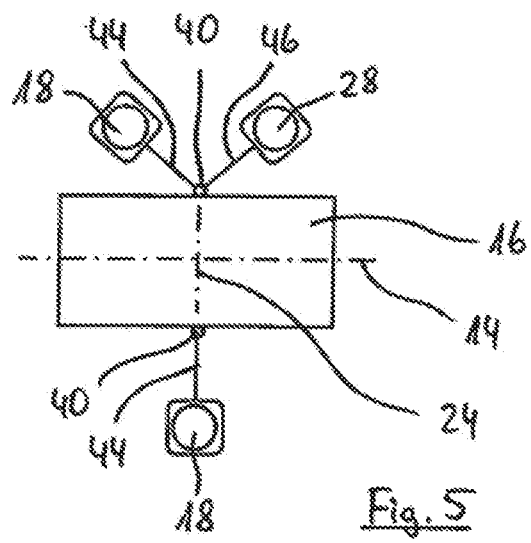
FIG. 5 shows a schematic plan view of a second conveyor device.
Figure 6:
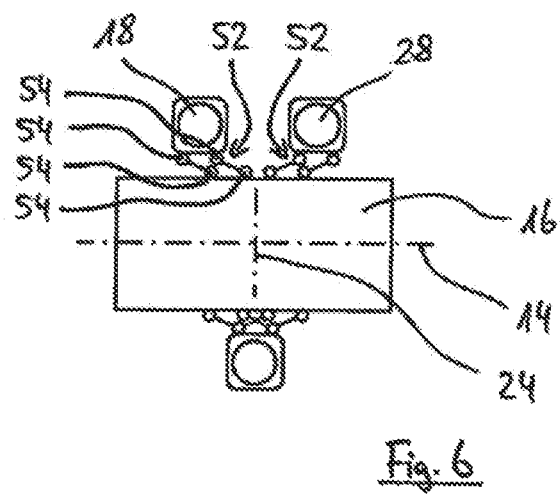
FIG. 6 shows a schematic plan view of a third conveyor device.
Figure 7:
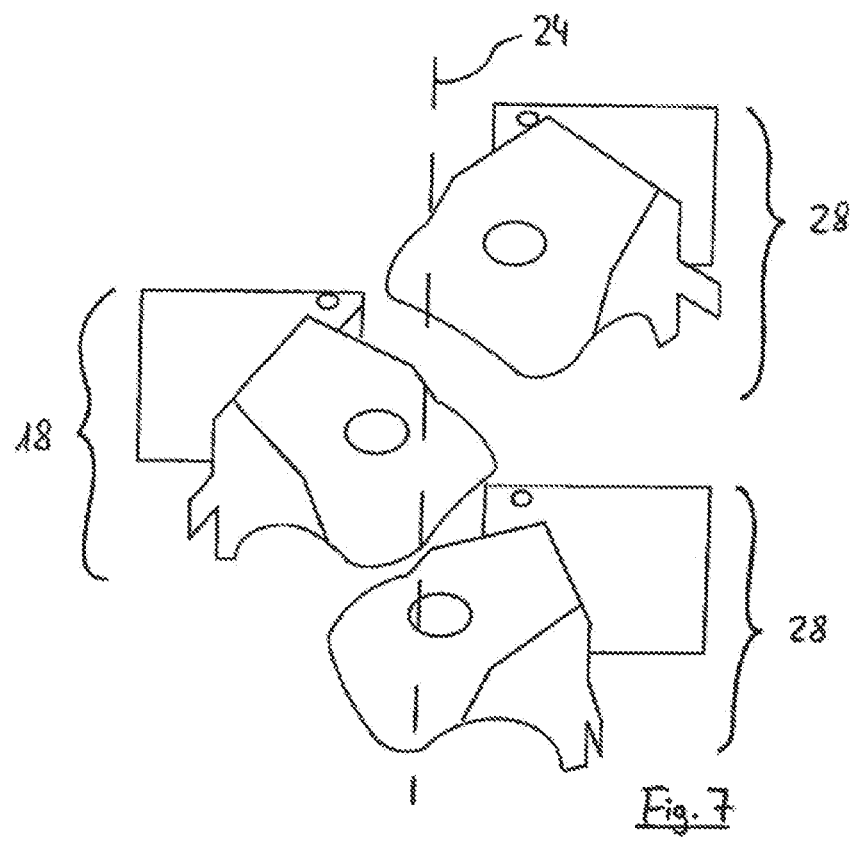
FIG. 7 shows a perspective view of a plurality of conveying elements arranged on the same carrier element.

If adjacent conveying elements 18, 28 are each in their first position with respect to the direction of rotation 12, their distance with respect to the transverse direction parallel to the deflection axis 14 is at a maximum (see, for example, FIGS. 4, 5 and 6, each above). If the same conveying elements 18, 28 of the exemplary embodiments shown are in the second position, they are arranged one behind the other as viewed in the direction of rotation 12 (FIGS. 4, 5, and 6, each below).

The conveying elements 18, 28 are each movable towards a carrier element longitudinal plane 24 for their transfer from the first to the second position. This plane extends vertically and in the direction of travel 66 and intersects the carrier element 16, particularly centrally (see FIG. 10 et seq.). In this regard, the carrier element longitudinal plane 24 is also disposed between the first conveying elements 18 and the second conveying elements 28. These are arranged alternately on the carrier element 16 with respect to the direction of rotation 12 and are mounted in mirrored fashion as viewed in the direction of rotation 12.

Figure 17:
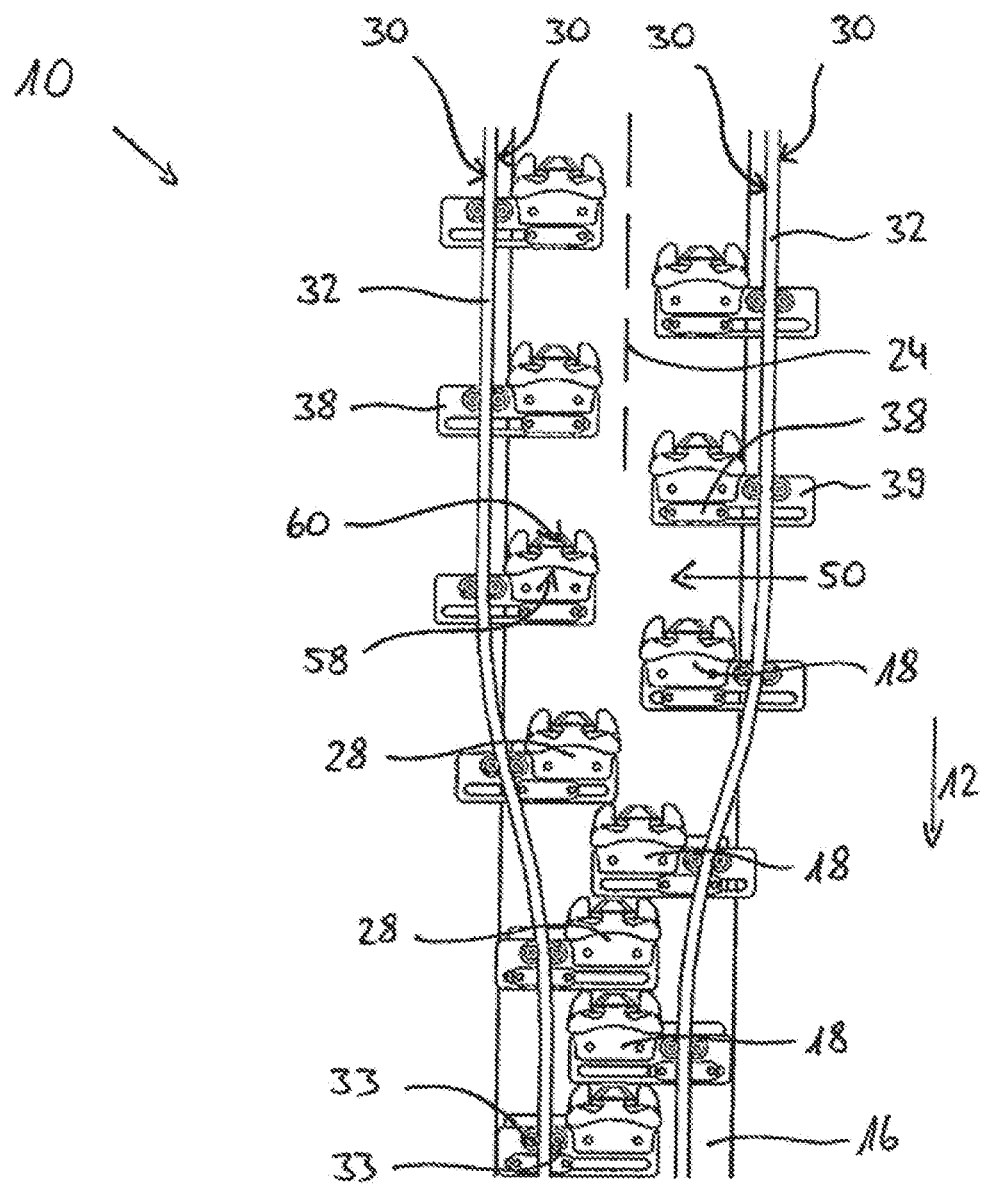
FIG. 17 shows another plan view of the ninth conveyor device.

The conveyor devices 10 shown are configured to transfer all of the conveying elements 18, 28 from the first position to the second position during operation and along the direction of rotation 12 between the storage space 6 and the dispensing area 22. For this purpose, the device 2 has at least one guide element 32 that is stationary relative to a machine frame 26 or conveyor device frame (see FIG. 17) and forms at least one guide surface 30. A forced movement of the conveying elements 18, 28 due to the guide elements 32 is generated with the movement of the carrier element 16 in the direction of rotation 12. A distance or orientation of the guide surface 30 to the carrier element longitudinal plane 24 and/or to a carrier element transverse plane 34 perpendicular to the carrier element longitudinal plane 24 (see FIG. 13), in which the deflection axis 14 is arranged, varies depending on the design of the conveyor device 10. The transverse plane 34 of the carrier element extends locally parallel to the direction of rotation 12. The guide element 32 is preferably positioned in such a way that the conveying elements 18, 28 are moved downwards along the guide element 32 during operation.

Figure 8:
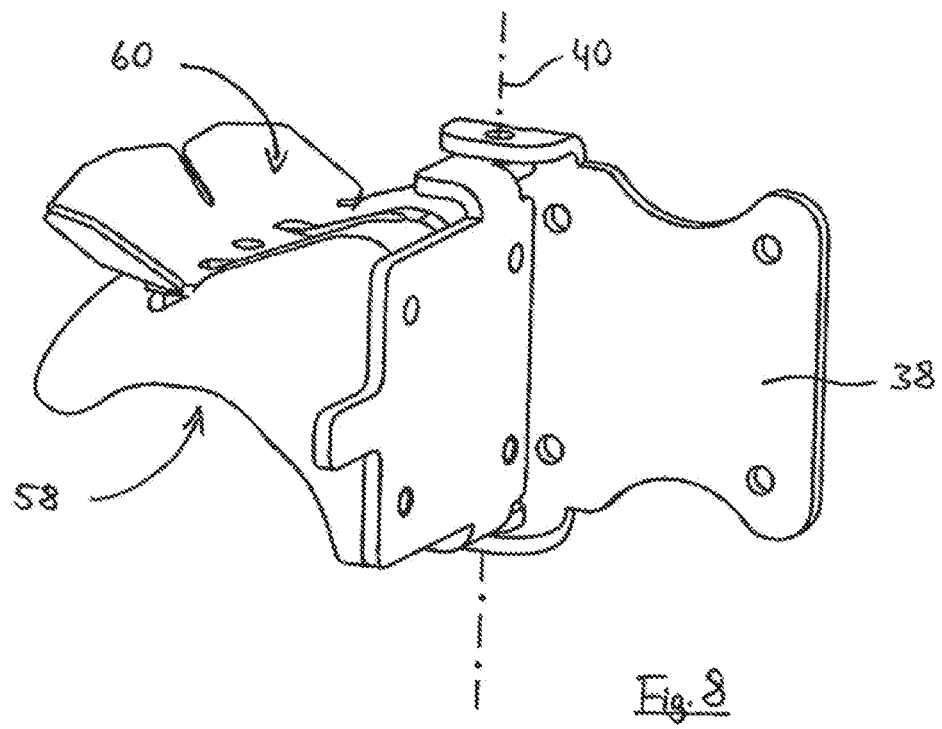
FIG. 8 shows a perspective view of another conveying element with a movement device.

According to one of the parts of the exemplary embodiments, the conveying elements 18, 28 are mounted on the carrier element 16 in such a way that there is no relative movement in the direction of rotation 12 relative to the carrier element 16 when these elements transfer from the first to the second position. Furthermore, a distance of the carrier element 16 to the conveying elements 18, 28 in the first position is preferably as large as in their second position (see FIGS. 4, 6). A movement device is assigned to the conveying elements 18, 28 in the exemplary embodiments shown to implement their transferability. In the exemplary embodiments according to FIGS. 8, 9 and 17, the movement device comprises a fixing element 38 arranged in a stationary manner on the carrier element 16.

According to some of the exemplary embodiments shown, the conveying elements 18, 28 are arranged on the carrier element 16 so as to be at least partially pivotable about respective conveying element pivot axes 40, 42 (see FIGS. 2-5, 7-14, 18 and 19). Particularly, the conveying element pivot axes 40, 42 are arranged parallel to the direction of rotation 12 at least temporarily during operation, whereby the respective conveying elements 18, 28 can be pivoted laterally with respect to the direction of rotation 12. According to a portion of said exemplary embodiments (see particularly FIG. 4), a conveying element pivot axis 40 of a first conveying element 18 and a conveying element pivot axis 42 of a second conveying element 28 are not arranged coaxially when viewed in the direction of rotation 12 but are arranged on different sides of the carrier element longitudinal plane 24. Particularly, the conveying element pivot axes 40, 42 are arranged in such a way that the conveying elements 18, 28 lie centrally one behind the other in their second position as viewed in the direction of rotation 12. The conveying elements 18, 28 are transferred along a downward strand of the carrier element 16 (see FIG. 14).

Figure 9:
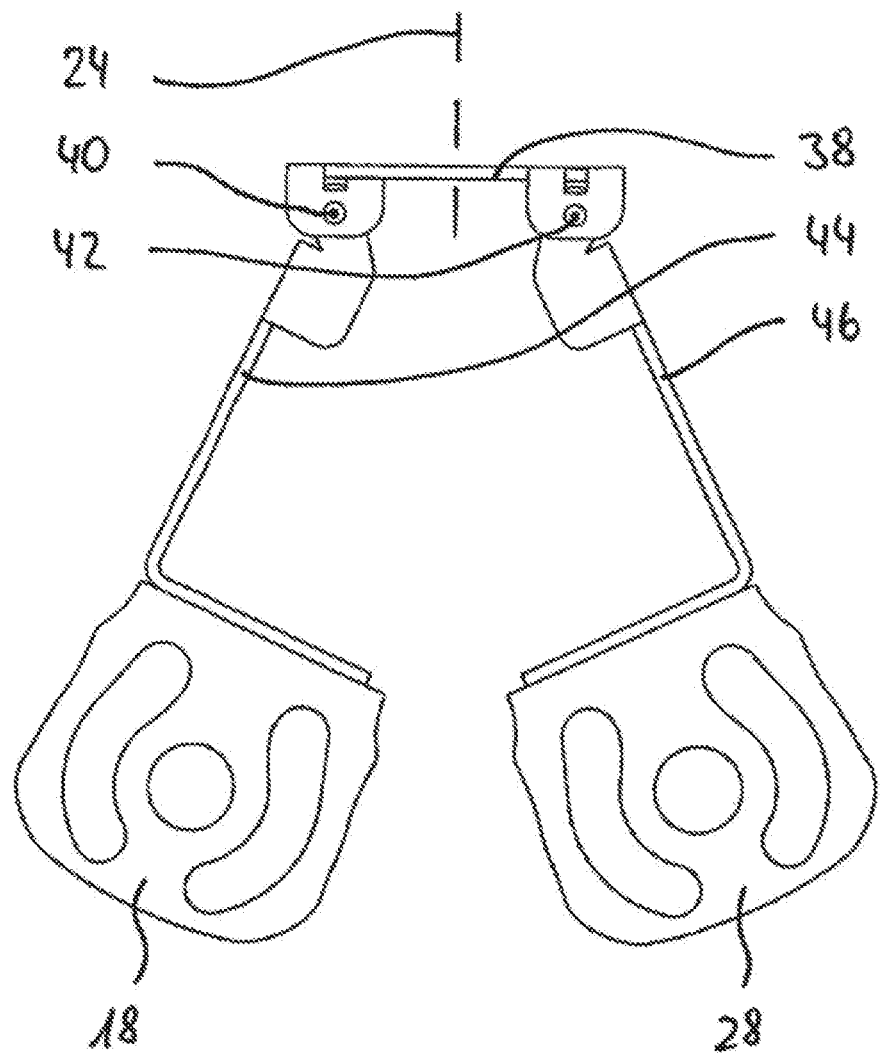
FIG. 9 shows a view of two other conveying elements arranged on the same carrier element with different movement devices.

The embodiments according to FIGS. 5 and 9 show holding elements 44, 46 arranged in a stationary manner on the respective conveying elements 18, 28. The conveying elements 18, 28 are spaced apart from the respective conveying element pivot axis 40, 42 in a radial direction with respect to the respective conveying element pivot axis 40, 42 by means of the holding elements 44, 46. In this case, the holding elements 44, 46 are coupled to the fixing element 38 in a pivotally movable manner according to FIG. 9. The holding elements 44, 46 are arranged in mirror symmetry with respect to each other relative to the carrier element longitudinal plane 24, whereby the group of first conveying elements 18 can be easily guided separately from the group of second conveying elements 28.

In the exemplary embodiments according to FIGS. 10 and 11, a conveyor device 10 with pivotally mounted conveying elements 18, 28 is shown, wherein the conveying element pivot axes 40, 42 are arranged at right angles to the direction of rotation 12 and parallel to the carrier element longitudinal plane 24. In addition, the conveying elements 18, 28 in this exemplary embodiment include two dispenser troughs 48 angled to each other. As FIG. 11 illustrates, the conveying elements 18, 28 are tilted by 90° along the downward strand of the carrier element 16 relative to the longitudinal plane 24 of the carrier element, wherein the planting material component 20 resting thereon automatically passes from a first dispenser trough 48, which in the second position is arranged to the side of the planting material component 20, into a second dispenser trough 48, which in the first position is arranged to the side of the planting material component 20.

In the exemplary embodiments according to FIGS. 15-19, the conveying elements 18, 28 are arranged so as to be movable on the carrier element 16 at least proportionally in a thrust direction 50 perpendicular to the carrier element longitudinal plane 24. In this case, the different conveying elements 18, 28 can each be moved in the transverse direction towards the carrier element longitudinal plane 24 as far as the center of the carrier element 16. For this purpose, the embodiment according to FIG. 17 has a linear guide 39 around the fixing element 38 for each conveying element 18, 28. The linear guide 39 has two wheels 33, which during operation are arranged on both sides of the guide element 32.

In the exemplary embodiments according to FIGS. 18 and 19, the conveying elements 18, 28 are both movable in the thrust direction 50 and pivotable about a conveying element pivot axis 40, 42 perpendicular to the carrier element longitudinal plane 24. Preferably, different guide elements 32 exist for the pivoting and the pushing movement, which make a displacement independent of a pivoting and are not shown here.

Figure 20:
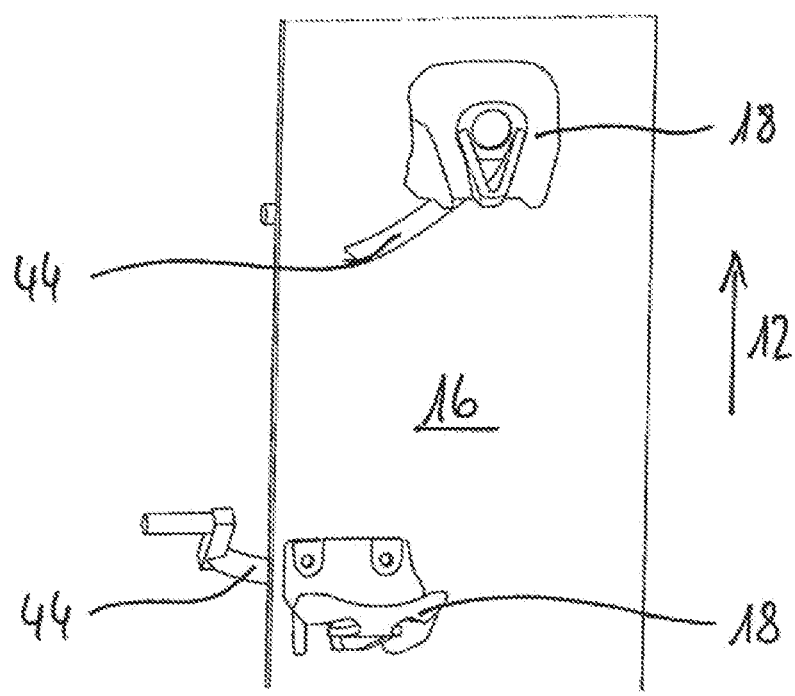
FIG. 20 shows a perspective view of sections of a carrier element of a twelfth conveyor device.

In the exemplary embodiment shown in FIG. 20, an arch or spiral shaped holding element 44 is associated with each of the conveying elements 18. Although this gives the conveying elements 18 only one degree of freedom, it allows them to be moved in a manner describing a complex, superimposed movement and to be pivoted about a pivot axis perpendicular to the carrier element longitudinal plane 24.

In contrast, the exemplary embodiment according to FIG. 6 has a coupling gear 52 per conveying element 18, 28 that forms a parallel guide. The coupling pivot axes 54 of the two coupling elements of each coupling gear 52 in this case run at least temporarily parallel to the direction of rotation 12 during operation.

In each exemplary embodiment shown, the conveying elements 18, 28 have a first side 58 and a second side 60. The first side 58 is directed upwards within the storage space 6 and is trough shaped. The second side 60 is directed downward within the storage space 6. Both sides 58, 60 are trough shaped. The trough-shaped design of the conveying elements 18, 28 on both sides means that, when the carrier element 16 passes from the upward strand to the downward strand, the planting material components 20 carried can be transferred by gravity in the direction of rotation 12 from the conveying elements 18, 28, which have received them in the storage space 6, to the conveying elements 18, 28 preceding them in the direction of rotation 12, and the planting material components 20 are reliably positioned after transfer as well (see particularly FIG. 13).

It should be noted that the exemplary embodiments according to FIGS. 10, 12, 15, and 18 differ from the exemplary embodiments according to the respective subsequent FIGS. 11, 14, 16, 19. In the first-mentioned group, movement of the conveying elements 18, 28 relative to the carrier element 16 takes place only in the region of the downward strand, which is not shown. In the second group, only the movement of the conveying elements 18, 28 from the first to the second position takes place in the area of the downward strand shown here.

The invention claimed is:

1. A device for separating planting material, comprising:
a hopper forming a storage space; and
at least one conveyor device configured for placing a row of the planting material, which conveyor device comprises:
at least one carrier element rotating in operation in a direction of rotation and about a deflection axis, and
a plurality of conveying elements arranged on the carrier element, which, in operation, each run through the storage space for receiving a planting material component being in a first position relative to the carrier element and through a dispensing area for dispensing the planting material component,
wherein at least a first conveying element is mounted so as to be movable relative to the carrier element from the first position into a second position at least proportionally parallel to the deflection axis, and wherein the first conveying element is associated with a movement device which comprises at least one fixing element that is fixed in a stationary manner to the carrier element and coupled at least indirectly to the first conveying element.

2. The device according to claim 1, wherein the first conveying element is arranged in the first position on one side of a carrier element longitudinal plane and at least a second one of the conveying elements is arranged in the first position on the other side of the carrier element longitudinal plane.

3. The device according to claim 2, wherein the first conveying element and the second conveying element are each mounted for movement from the first position toward the carrier element longitudinal plane to the second position.

4. The device according to claim 2, wherein the first conveying element and the second conveying element are arranged at least partially one behind the other in the second position as viewed in the direction of rotation.

5. The device according to claim 3, wherein the first conveying element in the first and/or second position is arranged at an offset relative to the direction of rotation with respect to the second conveying element in the first and/or second position.

6. The device according to claim 1, wherein the conveyor device transfers the first conveying element from the first position to the second position during operation and along the direction of rotation between the storage space and the dispensing area.

7. The device according to claim 1, further including at least one first guide element, which has at least one guide surface, is designed at least for partial movement of at least the first conveying element from the first position into the second position and/or back during the rotation of the carrier element.

8. The device according to claim 7, wherein a distance or an orientation of the guide surface to the carrier element longitudinal plane and/or to a carrier element transverse plane perpendicular to the carrier element longitudinal plane and extending locally parallel to the direction of rotation varies in the direction of rotation.

9. The device of claim 7, wherein the at least one guide member is positioned such that at least the first conveying member is moved at least proportionally downwardly along the guide member during operation.

10. The device according to claim 1, wherein the first conveying element is mounted such that it has an at least substantially coinciding distance from the carrier element in the first position and in the second position and/or is positioned at least substantially coincident relative to the carrier element with respect to the direction of rotation.

11. The device according to claim 1, wherein the first conveying element is arranged on the carrier element so as to be at least partially pivotable about a conveying element pivot axis.

12. The device according to claim 11, wherein the conveying element pivot axis is at least temporarily arranged parallel to the direction of rotation during operation.

13. The device according to claim 12, wherein:
the first conveying element is arranged in the first position on one side of a carrier element longitudinal plane and at least a second one of the plurality of conveying elements is arranged in the first position on the other side of the carrier element longitudinal plane; and
wherein, viewed in the direction of rotation, the conveying element pivot axis of the first conveying element is arranged on one side of the carrier element longitudinal plane and a conveying element pivot axis of the second conveying element is arranged on another side of the carrier element longitudinal plane.

14. The device according to claim 12, further including:
a holding element which is arranged in a stationary manner on the first conveying element and that spaces the first conveying element from the conveying element pivot axis with respect to the conveying element pivot axis in a radial direction.

15. The device according to claim 14, wherein:
the first conveying element is arranged in the first position on one side of a carrier element longitudinal plane and at least a second one of the plurality of conveying elements is arranged in said first position on the other side of the carrier element longitudinal plane; and
a first holding element is arranged on the first conveying element and a second holding element is arranged on the second conveying element, wherein the first and the second holding elements are formed deviating from each other.

16. The device according to claim 11, wherein the conveying element pivot axis is arranged at an angle to the direction of rotation and parallel to the carrier element longitudinal plane, wherein the first conveying element has at least two dispenser troughs arranged at an angle to one another about the conveying element pivot axis.

17. The device according to claim 1, wherein the first conveying element is arranged movably on the carrier element at least proportionally in a thrust direction at right angles to the carrier element longitudinal plane.

18. The device according to claim 1, wherein the first conveying element is arranged on the carrier element by a coupling gear, wherein coupling pivot axes of the coupling gear are arranged at least temporarily parallel to the direction of rotation.

19. The device according to claim 11, wherein the conveying element pivot axis is at an angle to the carrier element longitudinal plane.

20. The device according to claim 11, wherein:
the first conveying element is arranged movably on the carrier element at least proportionally in a thrust direction at right angles to the carrier element longitudinal plane; and
the first conveying element is mounted so as to be independently movable and pivotable.

21. The device according to claim 1, wherein the first conveying element is pivotable proportionally about a pivot axis parallel to the deflection axis via a holding element, which is at least in sections at least substantially arch or spiral segment-shaped, and is arranged on the carrier element so as to be movable proportionally in a thrust direction at right angles to the carrier element longitudinal plane.

22. The device according to claim 1, wherein the first conveying element is arranged on the respective carrier element such that the first conveying element, at least in the first position or in the second position, as viewed from a radial direction, projects beyond the carrier element transversely to the carrier element longitudinal plane.

23. The device according to claim 1, wherein the first conveying element has a first side which is directed upwardly within at least a part of the storage space and is trough-shaped, and has a second side which is directed downwardly within at least that part of the storage space.

24. A potato planter comprising:
a coupling device for coupling to a tractor; and
a device according to claim 1, further including a plurality of conveyor devices, each of which being associated with at least one blade element for producing a furrow, wherein the dispensing area is arranged downstream of the blade element with respect to a direction of travel.

* * * * *